United States Patent [19]

Tabata et al.

[11] Patent Number: 5,154,785
[45] Date of Patent: Oct. 13, 1992

[54] PROCESS FOR PRODUCING A ZIRCONIA REFRACTORY HEATING ELEMENT

[75] Inventors: Katsuhiro Tabata, Ako; Masahiro Hayase, Bizen; Hajime Asami, Bizen; Hiroyuki Asakura, Bizen; Kenji Mitsui, Bizen, all of Japan

[73] Assignee: Shinagawa Shirorenga Kabushiki Kaisha, Tokyo, Japan

[21] Appl. No.: 669,666

[22] Filed: Mar. 14, 1991

Related U.S. Application Data

[62] Division of Ser. No. 306,441, Feb. 3, 1989, Pat. No. 5,073,689.

[30] Foreign Application Priority Data

| Feb. 6, 1988 [JP] | Japan | 63-26329 |
| May 18, 1988 [JP] | Japan | 63-119138 |
| Jul. 27, 1988 [JP] | Japan | 63-187346 |
| Aug. 24, 1988 [JP] | Japan | 63-210353 |

[51] Int. Cl.$^5$ ............... C04B 37/00; B31C 13/00
[52] U.S. Cl. ...................... 156/89; 156/184; 156/185; 264/63
[58] Field of Search ............ 156/89, 184, 185; 264/61, 63, 241, 295; 219/553, 538, 541

[56] References Cited

U.S. PATENT DOCUMENTS

| 4,010,352 | 3/1977 | Phillips | 219/553 |
| 4,598,028 | 7/1986 | Rossing et al. | 429/30 |

Primary Examiner—Jan H. Silbaugh
Assistant Examiner—Christopher A. Fiorilla
Attorney, Agent, or Firm—Koda and Androlia

[57] ABSTRACT

A process for producing a laminate-shaped zirconia refractory heating element which generates heat by passing a current therethrough or by induction heating including the steps of incorporating a flexible binder in a filler composed of zirconia fibers and stabilized zirconia powder, forming the mixture into a refractory sheet having flexibility at room temperature, laminating the refractory sheet to form a multi-layer and firing the laminate.

4 Claims, 4 Drawing Sheets

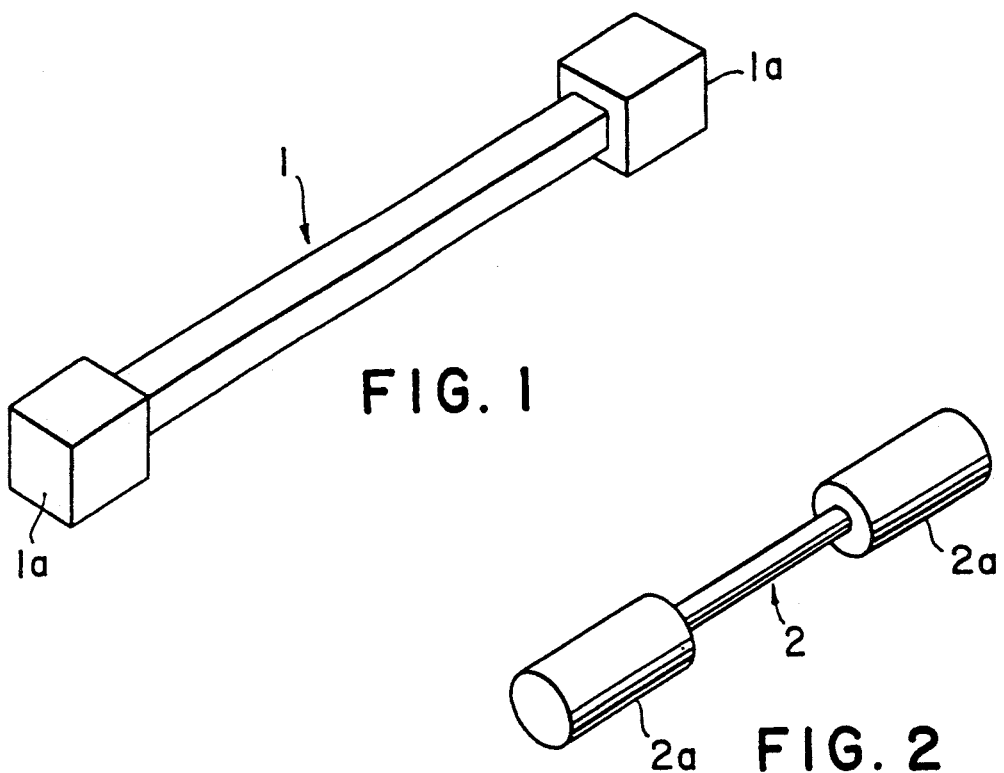
FIG. 1
FIG. 2
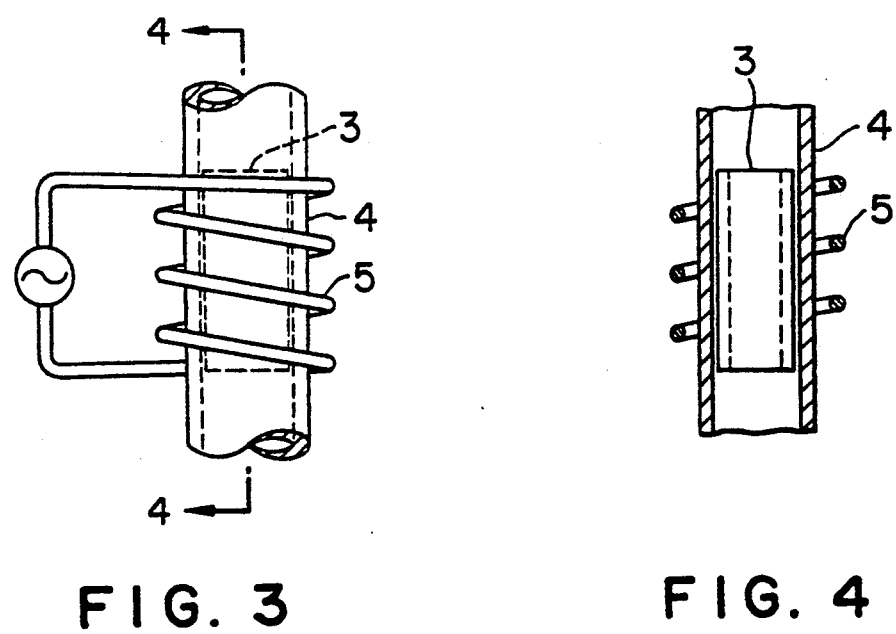
FIG. 3
FIG. 4

PROCESS FOR PRODUCING A ZIRCONIA REFRACTORY HEATING ELEMENT

This is a division of application Ser. No. 306,441, filed Feb. 3, 1989, now U.S. Pat. No. 5,073,68.

BACKGROUND OF THE INVENTION

The present invention relates to a ceramic heating element and, more particularly, to a zirconia fiber-based or zirconia fiber-reinforced zirconia heating element which generates heat by passing a current or by induction heating, and a process therefor. The present invention also relates to a heating structure composed of such a zirconia heating element and a lead member for passing a current and a process therefor.

Heretofore, the heating elements used in oxidizing atmospheres have varied depending upon the temperatures used. In general, SiC heating elements have been used at temperatures up to about 1,400° C., and $MoSi_2$ heating elements have been used at temperatures up to 1,700° C. Heating elements capable of being used at higher temperatures have not been widely utilized. While heating elements of $La_2O_3$-$Cr_2O_3$ system have been partially used, it is not widespread because $La_2O_3$ is expensive, is difficult to prepare a large sintered body and because $Cr_2O_3$ evaporates with use of the heating elements, to contaminate the inner portion cf a furnace.

On the other hand, there have been developed resistance heating units composed of negative characteristic elements exhibiting electric conductivity in the vicinity of 1,000° C. by heating ceramic materials containing zirconia ($ZrO_2$) or thoria ($ThO_2$) and other additives such as calcia (CaO) or yttria ($Y_2O_3$). (Japanese Patent Publication No. 12330/1963 or the like). Ultra-high temperature furnaces composed of resistance heating units have been already partially practically utilized It is expected that resistance heating units will become widely utilized to produce high melting point single crystals, to produce special high temperature materials, or to study physical properties at high temperatures.

Of these, zirconia heating elements are heating materials obtained by adding a small amount of specific oxides to zirconium oxide ($ZrO_2$) and sintering the mixture at a high temperature Because the melting point of zirconia ($ZrO_2$) is 2,690° C., zirconia heating elements can afford high temperature of up to 2,400° C.

However, the prior zirconia heating elements often fail due to the fact that current is locally passed. Their heat conductivity is low and their coefficient of expansion is large. Accordingly, the prior zirconia heating elements exhibit low thermal shock resistance and tend to be damaged by shock. Accordingly, zirconia heating elements have not been substantially produced.

Further, heretofore, in order to form zirconia heating structures from these zirconia heating elements, the following methods have been utilized: a method wherein pores are formed in said heating element body, platinum wires passed through the pores as lead members for passing a current, and entwined to fix them; another method wherein a platinum paste is applied to the heating element body and this heating element body is joined to lead members for passing a current at diffusion areas as wide as possible.

However, the former method poses a relaxation problem in use, whereas the latter method puts large restrictions on the form of the furnaces. Further, these methods can fail due to the fact that a current is locally passed through the contact portion between the lead member for passing a current, and the heating element body.

There has also been proposed a method of securing a heating element body and a lead member for passing a current by means of a castable refractory. However, when both members are secured by means of the prior castable refractory, they cannot follow in thermal expansion or shrinkage generated by passing a current, and the contact resistance associated with the generation of cracks is increased. Thus, the lead member for passing the current is overheated and damaged, and therefore the prior product cannot be used as a heating element in many cases.

An object of the present invention is to provide a zirconia heating element which generates heat by passing a current or by induction heating and a process therefor, wherein the zirconia heating element has excellent exothermic characteristics when a current is passed and wherein it has resistance to thermal shock.

Another object of the present invention is to provide a process for producing a zirconia heating element which has excellent current-passing exothermic characteristics or induction heating characteristics and resistance to thermal shock wherein the variation of these characteristics is little if damage should occur, and wherein the zirconia heating element can be readily produced.

A further object of the present invention is to provide a practical zirconia heating structure obtained by joining a heating element body and a lead member for passing a current using a composition exhibiting conductivity at a high temperature which can strongly join the zirconia heating element electrically and mechanically and the lead member for passing a current through the zirconia heating element wherein the lead member has sufficient conductivity even at room temperature; and a process therefor.

SUMMARY OF THE INVENTION

An attempt has been made to improve the characteristics of zirconia heating elements. We have now found that, when a zirconia heating element composed of a zirconia fiber or reinforced with the zirconia fiber is used, the objects of the present invention are effectively achieved.

Thus, in a first aspect, the present invention relates to a zirconia refractory heating element which generates heat by passing a current or by induction heating, said zirconia refractory heating element comprising a zirconia fiber.

In a preferred embodiment, a zirconia fiber is used as a reinforcing agent. In this embodiment, 100 parts by weight of a zirconia powder are incorporated in from 5 to 1,000 parts by weight of a zirconia fiber.

An attempt has also been made to improve the characteristics of a refractory heating element. We have now found that, when a zirconia fiber-reinforced flexible refractory sheet is used as a stock and laminated in the form of a roll or multilayer to produce a zirconia heating element, the objects of the present invention are achieved particularly effectively.

Thus, in a second aspect, the present invention relates to a process for producing a zirconia refractory heating element which comprises the steps of incorporating a flexible binder in a filler composed of a zirconia fiber and zirconia powder to which a zirconia stabilizer has been added; forming the mixture into a refractory sheet having flexibility at room temperature; winding and laminating said refractory sheet in the form of a roll or laminating said refractory sheet in the form of a multilayer; and firing the laminate.

In a preferred embodiment of the process according to the present invention, in laminating the refractory sheet, the attachment side of a lead wire for passing a current can be fixed to the refractory sheet and thereafter the said sheet can be laminated.

Further, we have discovered that, when a specimen obtained by forming a zirconia curing composition described hereinafter into a rod and firing the rod is used to examine its electrical resistance at high temperatures, it has sufficient conductivity of from about 3 to about 50 $\Omega \cdot cm$ at 1,700° C. We have now found that the specimen can be utilized in order to join a lead member for passing a current (a wire rod, rod or plate) to a zirconia heating element.

Thus, in a third aspect, the present invention relates to a zirconia heating structure which generates heat by passing a current, said structure comprising a zirconia heating element and a lead member for passing a current, wherein the junction portions between said zirconia heating element and said lead member for passing the current and the peripheries thereof are coated with a zirconia curing composition comprising a zirconia fiber, a zirconia powder, a water-soluble zirconium salt as a binder (its aqueous solution exhibiting acidity), and yttria or a water-insoluble yttrium compound as a curing agent to join the zirconia heating element and the lead member; and to a process therefor.

In a preferred embodiment, the zirconia heating structure can be further impregnated with a zirconia sol and/or a solution of a zirconium compound after the zirconia curing composition is cured and fired.

BRIEF DESCRIPTION OF THE DRAWINGS

FIG. 1 is a perspective view showing the shape of a heating element used in a service test;

FIG. 2 is a perspective view showing the shape of a heating element of another embodiment used in a service test;

FIG. 3 is a perspective view showing the state wherein a heating element is subjected to induction heating;

FIG. 4 is a sectional view taken along line 4—4 of FIG. 3;

DETAILED DESCRIPTION OF THE INVENTION

Figure 5A:
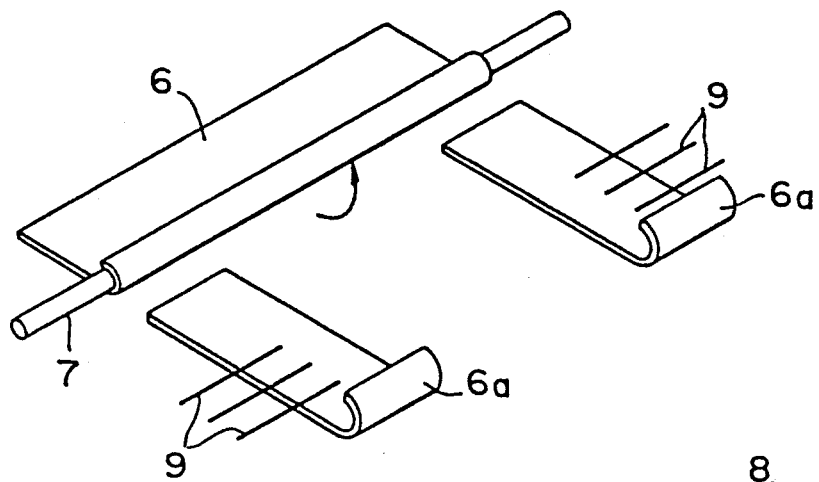
FIGS. 5 and 6 are views showing the steps for producing a heating element from a refractory sheet.

The present invention will be described in more detail.

[A] Zirconia Heating Element

(1) Zirconia Fiber

Zirconia fibers used in the present invention substantially consist of zirconium oxide represented by the chemical formula: $ZrO_2$. A zirconium compound such as zirconium carbonate or zirconium hydroxide, or a mixture of the zirconium compound and a stabilizer such as $Y_2O_3$, MgO or CaO can be optionally incorporated in the zirconia fibers. Examples of the zirconia fibers which can be used in the present invention include pure zirconia fibers, lime-stabilized zirconia fibers, magnesia-added zirconia fibers, yttria-added zirconia fibers, ceria-stabilized zirconia fibers, gadolia-stabilized zirconia fibers and mixtures thereof. Preferred zirconia fibers are zirconia fibers to which yttria has been added.

The zirconia fibers can be prepared by various methods. For example, zirconia fibers can be prepared by using an aqueous solution of a zirconium compound as a starting material (a spinning solution), fiberizing the aqueous solution to form a fiber precursor and firing the fiber precursor. The zirconia fibers can be suitably selected depending upon the uses and shapes of zirconia refractories.

The length and diameter of the zirconia fibers for use herein are, for example, from 0.1 to 50 millimeters and from 0.1 to 20 micrometers, respectively.

(2) Zirconia Powder

The zirconia powder used in a preferred embodiment of the present invention substantially consists of zirconium oxide. A zirconium compound such as zirconium carbonate or zirconium hydroxide, or a mixture of the zirconium compound and a stabilizer such as yttrium, magnesium or calcium can be optionally incorporated in the zirconia powder. The zirconia powder can be obtained by spray drying to a fine powder. The grain size of the zirconia powder is not particularly restricted in the present invention and can be suitably selected depending upon the uses and shapes of the zirconia refractory heating elements. For example, the particle diameter of the zirconia powder can be from 0.1 to 1,000 micrometers, preferably from 0.5 to 500 micrometers.

When the zirconia powder is incorporated in the zirconia fiber, the amount of the zirconia fiber is from 5 to 1,000 parts by weight, preferably from 10 to 100 parts by weight, and more preferably from 30 to 70 parts by weight based on 100 parts by weight of the zirconia powder. If the amount of the zirconia fiber added is less than the lower limit, a fiber-added effect will be small.

(3) Binder

Examples of the binders which can be used include synthetic polymers such as polyethylene oxide, polyvinyl alcohol and polyacrylic acid; cellulose derivatives such as methyl cellulose, carboxyethyl cellulose, hydroxymethyl cellulose, hydroxyethyl cellulose and cellulose phosphate; animal and plant viscous materials such as starch, its derivatives, pectin, sodium alginate, and agar; as well as a zirconia sol and/or an aqueous solution of a zirconium compound wherein such a sol or aqueous solution converts into zirconia by firing it.

A preferred binder is the zirconia sol and/or the aqueous solution of the zirconium compound wherein the sol or aqueous solution converts into zirconia by firing it. In a preferred embodiment of the present invention, the zirconia sol is, for example, a milky colloidal solution wherein zirconia having a particle diameter of about 70 millimicrons is suspended in water. For example, an aqueous solution of a zirconium salt can be used as the aqueous solution of the zirconium compound Examples of the zirconium salts include zirconyl acetate, zirconyl nitrate, zirconyl oxychloride, zirconyl sulfate, and ammonium zirconyl carbonate. Hydrolyzates of zirconium alkoxides such as tetrapropyl zirconate and tetrabutyl zirconate can also be used as the aqueous solution of the zirconium compound. These are converted into zirconia by firing them. The binder can be incorporated in the starting material components. Alternatively, molded products can be immersed in a binder solution.

(3-a) Zirconia Stabilizer

Other binders for use herein are crystal stabilizers for zirconia or precursors which convert into crystal stabilizer by heating. The crystal-stabilizing binders are metal oxides which exhibit zirconia crystal stabilization and/or metal salts which form metal oxides by heating. Examples of the binders include oxides, carbonates, basic carbonates, acetates, oxalates, nitrates, chlorides, and sulfates of magnesium, yttrium, calcium, gadolinium, cerium, samarium, cadmium, lanthanum, and neodymium. Powders of oxides, chlorides, carbonates, basic carbonates of magnesium, calcium and yttrium are preferred from the standpoint of economy.

The grain size of the binder of the metal oxides and metal salts is from 0.01 to 1,000 micrometers, preferably from 0.1 to 300 micrometers. If the grain size is less than the lower limit, migration phenomenon tends to occur on drying. If the grain size exceeds the upper limit, the performance of the binder will decrease and the strength will be lowered.

The amount of the crystal-stabilizing binder added is from 0.5 to 30 parts by weight, preferably from 1 to 20 parts by weight (on an oxide basis) based on 100 parts by weight of the zirconia fiber. If the amount of the crystal-stabilizing binder is less than the lower limit, the strength of a zirconia fiber molded product will be obtained. If the amount of the crystal-stabilizing binder is more than the upper limit, metals and glasses will not be wetted and the characteristics of a zirconia fiber molded product (i.e., excellent conductivity, chemically stablility and corrosion resistance) will be impaired.

(4) Additive

In addition to the components described above, various additives can be used herein depending upon purposes. Examples of such additives include pore-forming agents, surfactants, dispersants, flocculants and crystal stabilizers.

In order to decrease the weight of the zirconia heating element of the present invention and to use it as filters or catalyst carriers, materials which form a number of pores in a molded product by burning out or gasifying by firing treatment, i.e., pore-forming agents may be added. Examples of such pore-forming agents include organic spheres such as foamed styrol beads, foamed urethane foam beads and polyethylene beads; and organic fibers such as synthetic fibers and natural fibers such as hemp yarns and cottons. The amount of the spherical or fibrous organic material which is the pore-forming agents varies depending upon their uses, porosity and pore size. For example, the amount of the spherical or fibrous organic material added is from 5 to 100 parts by weight based on 100 parts by weight of the total amount of the zirconia powder and zirconia fiber added. If the amount of the spherical or fibrous organic material is less than the lower limit, the porosity will be insufficient. If the amount of the spherical or fibrous organic material is more than the upper limit, the strength of the resulting zirconia composite refractory will be lowered and thus a sufficient handling strength cannot be obtained.

Conventional refractory powders such as alumina, zirconia and silica can be incorporated in the zirconia heating element according to the present invention to form a composite material. Further, various auxiliaries can be incorporated in the present zirconia heating element in order to impart various performances to the heating element which is a final product.

(5) Production

The zirconia heating element of the present invention can be prepared and molded by various methods.

Processes in which a zirconia fiber can be used as a reinforcing agent in embodiment having a zirconia powder incorporated include molding processes such as isostatic pressing, hot pressing, uniaxial pressing, casting and injection molding.

In the present invention, the resulting molded product may be dried after molding. The molded product may or may not be subjected to firing treatment. Such treatments can be suitably selected depending upon the kind of components from which the zirconia refractory heating element is produced, and the uses of the zirconia refractory heating element For example, the zirconia molded product may be dried after molding and may be used as a heating element for passing a current or as a heating element for induction heating as it is. When gas components generated from the added binder and firing shrinkage pose problems, firing treatment can be applied When firing treatment is applied, the firing temperature is, for example, from 800° to 2,200° C., and preferably from 1,500° to 2,000° C. If the firing temperature is less than the lower limit, the sintered strength will be weak. Firing can also be carried out by directly passing a current through the heating element or by conducting induction heating of said heating element using means such as coils for induction heating.

Firing of the resulting zirconia heating element can be carried out by cutting or dividing into a desired shape.

In the case of molded products essentially consisting of zirconia fibers, molding can be carried out by various procedures depending upon the form of the desired final products. For example, in the case of plate-shaped molded products, molding can be carried out by a lay-up molding method A binder which is the crystal stabilizer described above is optionally added to a predetermined amount of the zirconia fibers and the resulting mixture is dispersed in a dispersion medium to prepare a slurry. The slurry is subjected to lay-up molding to obtain a plate-shaped molded product. In lay-up molding, it is desirable that the binder is not substantially dissolved in the dispersion medium This is because an effect of preventing migration phenomenon cannot be obtained when the binder is dissolved in the dispersion medium. Accordingly, in the cases of nonaqueous metal salts and oxides, water can be used as a dispersion medium. In the cases of aqueous metal salts, it is desirable that kerosene, heavy oil, alcohols and the like be used as a dispersion medium. Sizing agents such as polyvinyl acetate, polyacrylic acid, carboxymethyl cellulose, methyl cellulose and polyethylene oxide may be added to a dispersion medium for purposes of imparting viscosity to the dispersion and providing strength after drying.

Molding methods other than lay-up molding include a method wherein a dispersion medium containing a sizing agent is sprayed to an assembly having a predetermined shape composed of zirconia fibers; and another method wherein the assembly is immersed in a dispersion medium containing a sizing agent.

Thereafter, the molded product is usually subjected to drying treatment. Drying can be carried out by various methods such as spontaneous drying, blower drying, hot air drying and heat ray drying.

The zirconia fiber molded product according to the present invention can be impregnated with a zirconia sol and/or a solution of a zirconium compound which can convert into zirconia by firing, before or after drying, or before or after firing. Firing carried out after impregnation renders the connection structure of fibers to a structure ideal as a heating element.

The term "a zirconia sol and/or a solution of a zirconium compound which can convert into zirconia by firing" is already described and therefore omitted herein.

The zirconia fiber molded product according to the present invention can be used as a heating element for passing a current or as a heating element for induction heating after drying The molded product may be utilized in such uses after firing. By firing, the zirconia sol and/or the solution of the zirconium compound convert into zirconia, and the binder which is the crystal stabilizer contributes to bonding between zirconia fibers and stabilization of crystals by the zirconia fibers. It is desirable that the firing temperature varies suitably depending upon the kind of the added binder and the like, for example, from 1,300° C. to 2,000° C. The starting composition is heated to a firing temperature and maintained at this temperature for a predetermined period of time to obtain a zirconia fiber molded product.

The zirconia refractory heating element according to the present invention can be formed in the various forms or dimensions. However, it is, in general, required that the diameters of the end or terminal parts in the form of a rod are larger than that of the heating part to reduce the resistance and heating temperature of the former compared with those of the latter.

The zirconia refractory heating elements according to the present invention are described in detail by Examples 1 through 6 and Comparative Examples 1 through 4 with reference to FIGS. 1-4. Examples 1 through 4 and Comparative Examples 1 and 2 are examples wherein current-passing heating is carried out, and Examples 5 and 6 and Comparative Examples 3 and 4 are examples wherein induction heating is carried out.

[B] Production of Laminate-shaped Zirconia Refractory Heating Elements

In particular, the zirconia refractory heating elements described above can be prepared in the form of a laminate to use the laminate with good results. Thus, the present invention provides also a process for producing such a laminate-shaped zirconia refractory heating element. In this case, there is used a starting material obtained by incorporating a flexible binder in a filler composed of a zirconia fiber and zirconia powder to which a zirconia stabilizer has been added. The starting material is spread to form a refractory sheet having flexibility at room temperature and a high strength.

The refractory sheet is then wound in the form of a roll to form an approximately cylindrical laminate. The refractory sheet is folded once or zigzag folded many times to stack it to form a multilayer-shaped laminate. Alternatively, refractory sheets previously cut to a predetermined size are stacked to form a multilayer-shaped laminate.

The laminate is fired to cure it in a state having the shape described above, thereby obtaining a zirconia refractory heating element of the present invention in the form of a laminated molded product.

In this heating element, the zirconia fibers have excellent mechanical strength and thermal shock properties and therefore they remarkably enhance the mechanical characteristics of the heating element and act as a reinforcing agent for zirconia powder. Further, the zirconia fibers have a high melting point of at least about 2,600° C. and therefore phenomena such as decomposition and melting which often occur in the cases of refractory fibers other than the zirconia fibers do not occur. Because the present heating element has a structure wherein the heating element sheet is wound and laminated in the form of a roll or laminated in the form of a multilayer, damage of only one layer of the heating element can occur if the heating element should be damaged. Thus, as a whole, variation of characteristics such as electrical resistance of the heating element is substantially inhibited.

The heating element raises the temperature by placing it in a magnetic field generated by a high frequency current passed through a coil for induction heating or by directly passing a current through the heating element.

In laminating the refractory sheet, the attaching side of a lead wire for passing a current is fixed to the refractory sheet, thereafter said refractory sheet is laminated as described above, and the laminate is fired, whereby a heating element having the lead wire for passing the current is obtained.

When a current is passed through the lead wire for passing the current, a current is directly passed through the heating element and the heating element generates heat by Joule heat due to the resistance of said heating element.

In a process for producing a laminate-shaped zirconia refractory heating element according to the present invention, a refractory sheet having flexibility at room temperature is first prepared.

The refractory sheet is obtained by incorporating from 20 to 50 parts by weight of a flexible binder in 100 parts by weight of a filler composed of from 5 to 80 parts by weight of a zirconia fiber and from 20 to 95 parts by weight of a zirconia stabilizer-added zirconia powder.

The zirconia fiber, zirconia powder and zirconia stabilizer are as described above.

As described above, the amount of the zirconia fiber added is also from 5 to 80 parts by weight based on from 20 to 95 parts by weight of the zirconia powder. The preferred amount of the zirconia fiber added is from 10 to 50 parts by weight. If the amount of the fiber is less than 5 parts by weight, the reinforcing effect will be little. If the amount of fiber is more than 80 parts by weight, forming into a refractory sheet will become difficult.

The flexible binder for use herein comprises an emulsion of a suitable synthetic resin such as a vinyl acetate resin or polyacrylate and at least one plasticizer such as ethylene glycol, glycerin or dibutyl phthalate.

It is preferred that the amount of the plasticizer added be from 5 to 25 parts by weight based on 100 parts by weight of the synthetic resin emulsion described above.

It is preferred that the amount of such a flexible binder added be from 20 to 50 parts by weight based on 100 parts by weight of the filler described above. If the amount of the flexible binder added is less than 20 parts by weight, the flexibility of the refractory sheet will be insufficient and cracks are liable to occur in laminating the refractory sheet. If the amount of the flexible binder added is more than 50 parts by weight, the refractory heating element will become brittle after the flexible binder is burnt out.

A reinforcing binder can be optionally added to the refractory sheet. A preferred reinforcing binder is a sol or aqueous solution which converts into zirconia or an analogous compound by firing. Examples of reinforcing binders include aqueous solutions of water-soluble salts such as zirconyl acetate, zirconium acetate, yttrium acetate, zirconium chloride and yttrium chloride, and zirconia sols. The reinforcing binder is used in an amount of from about 0 to about 30 parts by weight.

The use of the reinforcing binder provides a self-hardening refractory sheet and increases the strength. Accordingly, the drying operation and firing operation of the refractory sheet are improved.

A refractory sheet having flexibility at room temperature is obtained by spreading the starting material for refractory sheet having such a composition by means of rolls to form a sheet or by extruding the starting material by extrusion molding to form a sheet. It is preferred that the thickness of the refractory sheet be from about 0 1 to about 1 millimeter.

An approximately cylindrical laminate can be then formed by winding the refractory sheet around a fine rod-like core, or by winding the refractory sheet such that one end of said sheet is a base without using the core. When metal pipes and plastic pipes having the required diameter are used as the core, a cylindrical laminate can be formed. While the core described above is removed by withdrawing it after drying or by burning out it during firing in the case of wood or plastic, the core serves to prevent the refractory from deforming during drying and plays a role of preventing overheat of the central portion of a heating element by forming a through hole in the refractory sheet after removing the core.

Alternatively, a multilayer-shaped laminate can be formed by folding the refractory sheet once or by zig-zag folding it many times to stack it. Refractory sheets previously cut to a predetermined size may be stacked.

The wound end of the laminate described above may be secured to a lower layer by pressing. Alternatively, the wound end of the laminate may be fixed by applying a mortar (a zirconia curing composition) as described hereinafter.

In forming the laminate as described above by the refractory sheet(s), a lead wire for passing a current can be attached. In the cases of cylindrical solid or hollow laminates, the following methods can be used. In one method, a lead wire is securely fixed to the lead wire-attaching portion of a refractory sheet in such a state that the end of the lead wire is bent shortly to insert in the refractory sheet, and the refractory sheet is wound and laminated as it is. In another method, a refractory sheet is cut to prepare lead wire-attaching sheets having a narrower width and the end of a lead wire is inserted in the lead wire-attaching portion of the lead wire-attaching sheets to securely fix the lead wire to the sheet. In a further method, a lead wire is wound around a lead wire-attaching portion of a refractory sheet to fix the lead wire to the refractory sheet, and the lead wire-attaching sheet is wound and laminated to both ends of a laminate body to attach the lead wire.

In the case of a multilayer-shaped laminate, the end of a short bent lead wire is inserted in the lead wire-attaching portion of a refractory sheet to securely fix the lead wire to the refractory sheet and thus the refractory sheet is folded in the form a multilayer to laminate it.

The zirconia curing composition described in detail hereinafter may be applied to the attaching site of the lead wire described above and the lead wire-attaching sheet to more strongly adhere them.

Besides the method of applying the curing composition to the winding end of the laminate as described above, the curing composition may be used to strongly adhere stacked layers by applying it to the whole surface of a refractory sheet and then forming it into a laminate.

A zirconia refractory heating element according to the present invention is obtained by firing the resulting laminate after drying treatment. The firing temperature can be, for example, at least 800° C. The firing temperature is preferably at least 1,400° C., more preferably from 1,500° to 2,400° C. if the firing temperature is below the lower limit, the sintered strength will be weak. Firing can also be carried out by subjecting the laminate to induction heating after drying treatment.

In order to prevent the deformation of the laminate during firing, the following methods can be used. In one method, a hole is pierced in one end of said laminate, and an alumina pipe is passed through the hole to suspend the laminate. In another method, the outside of the laminate is protected by a holding fixture to hold the shape and firing treatment is carried out in this state. In these cases, cores which can be burnt out may be used.

When the firing temperature exceeds 1,700° C., it is difficult to fire a laminate having a previously attached platinum lead wire or a suspended laminate, in respect of strength. Thus, in these cases, it is preferred that the following method be used. A laminate is first subjected to prefiring at a temperature of from 1,400° to 1,700° C. to obtain strength sufficient to place the laminate in a furnace as a heating element, the prefired laminate is attached to a furnace, and a current is passed through the laminate or the laminate subjected to induction heating to fire it.

Attachment of a lead wire for passing a current may be carried out after firing.

Figure 5B:
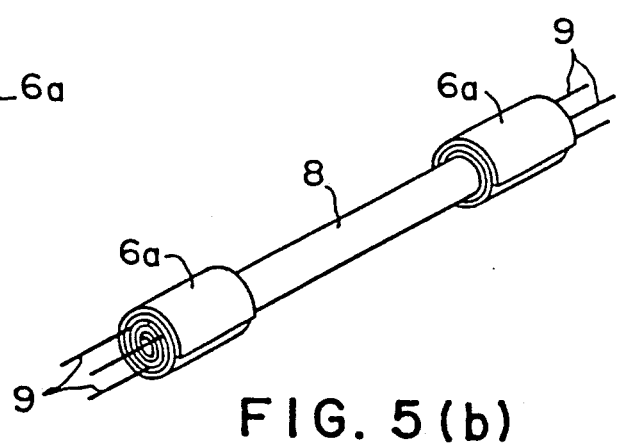
Figure 6A:
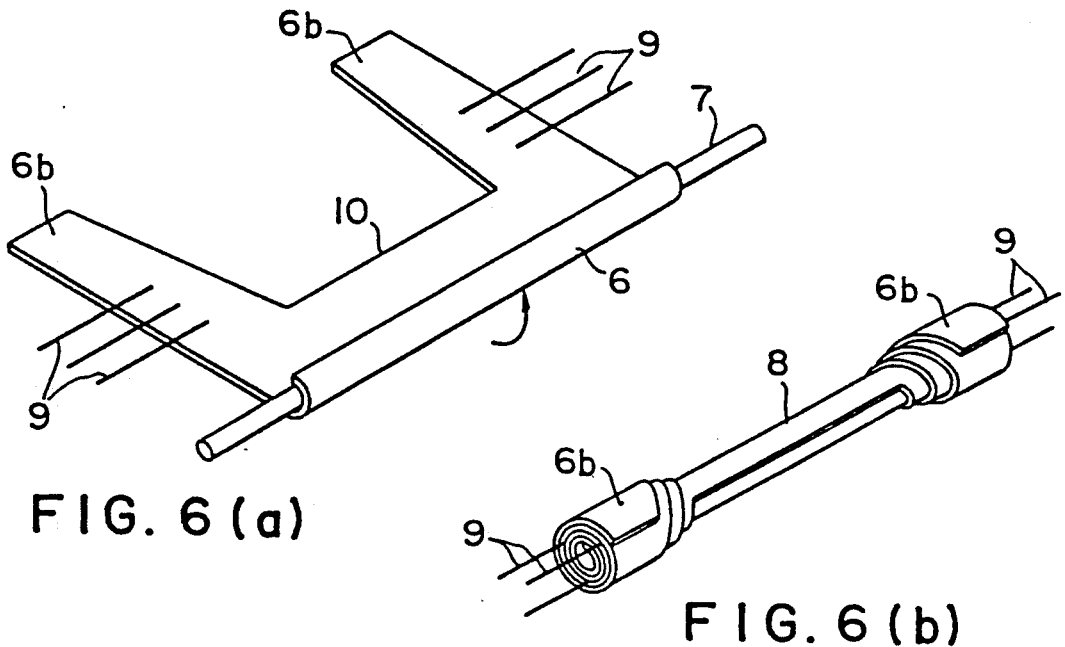
Figure 6B:
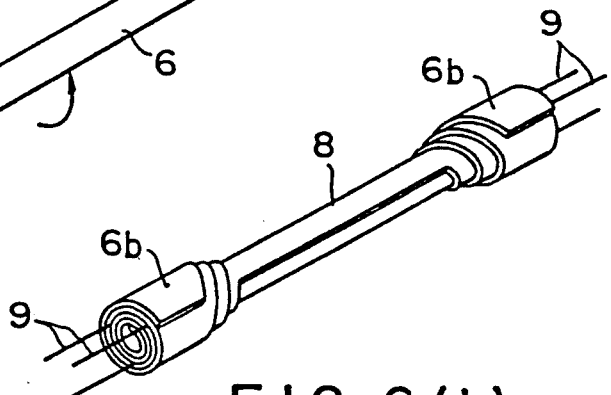

The process for producing the zirconia heating element in the form of laminated molded products is described in more detail by Examples 7, 8 and 9 and Comparative Examples 5 through 7 with reference to FIGS. 5 and 6.

C] Zirconia Refractory Heating Structure and Process for Producing the Same

The present invention also relates to a zirconia heating structure and a process for producing the same.

The zirconia heating structure according to the present invention is one which generates heat by passing a current, said structure comprising the zirconia heating element as described above and a lead member for passing a current, wherein the junction portions between said zirconia heating element and said lead member for passing the current and the peripheries thereof are coated with a zirconia curing composition comprising a zirconia fiber, a zirconia powder, a water-soluble zirconium salt (its aqueous solution exhibiting an acidity) and yttria or a water-insoluble yttrium compound to join the zirconia heating element and the lead member. In producing the structure, the zirconia curing composition described above may be coated on the members described above and cured at room temperature. Alternatively, after the zirconia curing composition is cured and fired, the cured composition may be impregnated with a zirconia sol and/or a solution of a zirconium compound.

As described above, the zirconia heating element used in the zirconia heating structure of the present invention can use the following molded products: a molded product obtained by suitably mixing a zirconia powder, an additive, a stabilizer, a zirconia fiber and the like, hot or cold pressing the mixture and firing it; a molded product obtained by slip casting a similar mixture and firing it; or a molded product obtained by molding a zirconia fiber alone or a mixture of a zirconia fiber and a zirconia powder by a lay-up or pouring method and firing the resulting molded matter. It is desirable that a zirconia fiber be contained in these zirconia heating elements from the standpoint of utility. The zirconia fiber may contain oxides such as MgO, CaO, $Y_2O_3$ and $Gd_2O_3$ which act as stabilizers for zirconia.

The zirconia curing composition for securing the zirconia heating element body and current-passing lead member which are used in the present invention include a zirconia curing composition exhibiting self-hardening properties at room temperature which is obtained by using a zirconia fiber, a zirconia powder, a water-soluble zirconium salt as a binder (its aqueous solution exhibiting an acidity) and yttria or a water-insoluble yttrium compound as a curing agent.

The zirconia fiber used in the zirconia curing composition has excellent mechanical strength and thermal shock properties and therefore the zirconia fiber acts as a reinforcing agent for the zirconia powder. The zirconia fiber absorbs stress resulting from the difference in thermal expansion between the heating element body and the lead member for passing the current, and its conductivity is improved.

Further, this composition exhibits self-hardening properties at room temperature due to the water-soluble zirconium salt which is the binder and the water-insoluble yttrium compound which is the curing agent, and the composition strongly joins the zirconia heating element and the lead member for passing the current.

The zirconia fiber and zirconia powder used in the zirconia curing composition are as described above. The water-soluble zirconium salts (their aqueous solution exhibiting an acidity) for use herein include zirconium acetate, zirconyl acetate, zirconium oxychloride, zirconium nitrate and zirconium sulfate. Taking into account the drawbacks that toxic gases are generated by decomposition of the binder component when the molded product obtained by curing at room temperature is fired, it is preferred that zirconium acetate or zirconyl acetate be used.

It is necessary that the concentration of the aqueous solution be at least 5%. If the concentration of the aqueous solution is less than 5%, the strength obtained after curing will be insufficient and handling of cured products will become difficult.

Another essential component of said zirconia curing composition is yttria or a water-insoluble yttrium compound. It is necessary that yttria has a purity of at least 90% by weight It is desirable that the grain size of yttria be no more than 1 millimeter. If the purity of yttria is less than 90% by weight or if the grain size of yttria is more than 1 millimeter, it is difficult for yttria to act as the curing agent.

The water-insoluble yttrium compounds include yttrium carbonate and yttrium hydroxide. These water-insoluble yttrium compounds are usually manufactured and sold in the form of a fine powder with a grain size of no more than 0.1 millimeter. While it is unnecessary to take into account the grain size, it is necessary that the purity of yttria formed by heating be at least 90% by weight.

The weight ratio of yttria or the water-insoluble yttrium compound to the water-soluble zirconium salt is as follows: The weight ratio of yttria (when the water-insoluble yttrium compound is used, the term refers to yttria formed by heating) to zirconia formed from the water-soluble zirconium salt is preferably 0.5–5:1. The curing time can be adjusted within the range of from 10 minutes to 10 hours by adjusting the ratio within the range described above. If the weight ratio is less than 0.5:1, the curing time will be excessively increased and therefore such a weight ratio is impractical If the weight ratio is more than 5:1, the curing time will be excessively decreased and the zirconia curing composition will cure during kneading.

The amount of the aqueous solution of the zirconium salt added is within the range of from 10 to 60 parts by weight based on 100 parts by weight of the total amount of the zirconia fiber and the zirconia powder. The amount of the aqueous solution of the added zirconium salt can vary depending upon the desired consistency of the body.

When viscosity modification is necessary in using the zirconia curing composition, conventional water-soluble organic sizing agents such as polyvinyl alcohol, methyl cellulose, carboxymethyl cellulose and polyethylene oxide can also be added.

It is necessary that the lead member for passing the current has sufficient conductivity at room temperature, that the lead member does not denature at considerably high temperatures and that its conductivity does not decrease extremely. The known materials from which the lead member for passing the current include platinum, molybdenum disilicide, silicon carbide and lanthanum chromite. These materials can be used herein. When a platinum wire rod is used as the lead member for passing the current, it is a material suitable as the current-passing lead member for the zirconia heating element unless the platinum wire rod is exposed to a temperature of 1 770° C. which is the melting point of platinum, or above.

In the zirconia heating structure of the present invention, the surface of the zirconia heating element may be in direct contact with the surface of the lead member for passing the current. Both members may be electrically connected via the zirconia curing composition described above. Further, the lead member for passing the current and the zirconia heating element may be physically preset (e.g., threaded, meshed by grooves, or wound) before the zirconia curing composition is used. Further, concavities and convexities can be formed in the lead member for passing the current and the zirconia heating element by fluting or the like so that (a) the cured product of the zirconia curing composition and the lead member, and (b) the cured product of the zirconia curing composition and the zirconia heating element are physically set after the zirconia curing composition is cured.

The zirconia heating structure of the present invention may or may not be fired. Further, the zirconia heating structure of the present invention may be fired and thereafter impregnated with a zirconia sol or aqueous solution of a zirconium compound which converts into zirconia by firing. Thereby, the pores of the zirconia cured composition are packed and such a treatment renders the texture more dense, enhances the strength and decreases the electrical resistance to improve the conductivity.

Firing treatment is preferably carried out at a temperature of from 1,200° to 1,750° C. (i.e., from the decomposition temperature of the binder component of the zirconia curing composition to the heat-resistant temperature of the lead member for passing the current).

The impregnating solutions include a zirconia sol and/or an aqueous solution of a zirconium compound which can convert into zirconia by firing. In a preferred embodiment of the present invention, the zirconia sol is a milky colloidal solution wherein zirconia having a particle diameter of, for example, about 70 millimicrons is suspended in water. For example, an aqueous solution of a zirconium salt can be used as the aqueous solution of the zirconium compound. Examples of the zirconium salts include zirconyl acetate, zirconyl nitrate, zirconyl oxychloride, zirconyl sulfate, and ammonium zirconyl carbonate. Hydrolyzates of zirconium alkoxides such as tetrapropyl zirconate and tetrabutyl zirconate can be used as the aqueous solution of the zirconium compound. These are converted into zirconia by firing them. The impregnating solution can be incorporated in a fired body by spraying it onto the surface of the fired body or by immersing the fired body in the impregnating solution.

In the present invention, other impregnating auxiliary agents can also be added. For example, chlorides, sulfates and nitrates of magnesium, yttrium, calcium, samarium, cadmium, lanthanum and neodymium can also be added as crystal stabilizers. The amount of the crystal stabilizer added is from 0.5 to 30 parts by weight based on 100 parts by weight of the impregnating solution (on a $ZrO_2$ basis).

The present zirconia heating structure and process therefor are described in detail by Examples 11 through 14 and Comparative Examples 7 and 8 with reference to FIGS. 8 through 11.

EFFECTS OF THE INVENTION

The zirconia refractory heating element according to the present invention generates heat by passing a current or by induction heating, and has the following effects and advantages.

(a) Because the zirconia fiber used in the zirconia refractory heating element according to the present invention has excellent mechanical strength, resistance to damage is high and the progress of cracks can be inhibited even if small flaws are present in the heating element.

(b) Because the zirconia refractory heating element according to the present invention contains the zirconia fiber having excellent mechanical and thermal characteristics, it imparts good thermal shock resistance to the heating element, and can be used in uses which are not possible in the case of the prior zirconia refractory element. For example, the present zirconia refractory heating element can be used as a lining material for high-speed temperature elevation furnaces.

(c) When the heating element of the present invention is impregnated with the zirconia sol and/or the aqueous solution of the zirconium compound as a binder or the zirconia sol or the aqueous solution of the zirconium compound is added to the heating element of the present invention, bonding between zirconia fibers to each other or bonding between the zirconia powder and the zirconia fiber is increased after firing Further, the binder per se forms a tough coat and has heat resistance equivalent to that of the zirconia fiber Thus, the resulting heating element can exhibit high mechanical strength and excellent chemical stability.

(d) Because the heating element according to the present invention has excellent thermal shock resistance, the low heat-conductive properties of zirconia can be fully utilized to sufficiently exhibit the heat-insulating characteristics.

(e) Because the present heating element contains zirconia fibers having excellent mechanical characteristics, it exhibits flexibility, and folding due to mechanical stress becomes difficult.

(f) In the heating element of the present invention, when the crystal stabilizer for zirconia or its precursor is used as the binder, the binder strongly adheres to the surface of the zirconia fibers Accordingly, the binder is not transferred to the surface of the molded product during drying and/or during sintering. Therefore, migration phenomenon which occur in the case of colloidal silica does not occur, and the whole of the molded product can have a uniform composition and strength. The metal oxide which is the crystal stabilizer has a high melting Point of from 2.500° to 2,800° C. and therefore a zirconia fiber molded product having high refractory properties can be obtained due to the combination with the zirconia fiber having a melting point of 2,600° C.

(g) The zirconia refractory heating element obtained by the present invention has excellent exothermic characteristics. The mechanical strength and thermal shock resistance are excellent because reinforcement by the zirconia fibers is achieved. When the zirconia refractory heating element has a laminated structure, the following advantages are obtained: if cracks should generate, the cracks are present in only one layer, and variation of characteristics of the whole of the heating element, e.g., change of electric resistance value can be inhibited to a lesser extent. The present heating element can withstand longer usage. Moreover, the zirconia refractory heating element can be readily produced.

(h) According to the process of the present invention, the degree of freedom of the shape of the heating element is large. When the heating element is cut to a shape which allows for the variation after firing, it is unnecessary to carry out machining for finishing. The manufacture steps and manufacture times can be reduced.

(i) Bubbles entrained in the materials in the operation of forming the materials into the flexible sheet can be removed by the process of the present invention, and more homogeneous heating elements can be readily obtained.

Further, according to the present zirconia heating structure and the process therefor, practical heating elements containing the zirconia fibers can join the lead member with the zirconia curing composition obtained by incorporating the zirconia fibers by the process of the present invention. Further, the cured product of said composition has conductivity and therefore the area of the contact portion between the heating element body and the lead member for passing a current can be increased. The damage of the heating element body attributable to the fact that a local current is passed through the contact portion can be prevented Heating structures for high temperatures having even higher utility can be provided.

If the pores of said cured composition are impregnated with the zirconia sol and/or the aqueous solution of the zirconium compound after firing the curing composition, bonding of the zirconia fibers to each other or bonding between the zirconia powder and the zirconia fiber can be increased and the electrical conductivity can be further improved.

While Examples described above demonstrate such embodiments that the heating element body of the zirconia heating structure of the present invention contains the zirconia fibers, heating element bodies used in the present invention are not limited thereto, and zirconia heating elements which have been used in the prior art can also be used herein.

EXAMPLE 1

Fifty parts by weight of a magnesia-stabilized zirconia powder having an average diameter of from 1 to 0.3 millimeter (5% of MgO and 95% of $ZrO_2$), 50 parts by weight of a magnesia-stabilized zirconia powder having a grain size of no more than 0.3 millimeter (5% of MgO and 95% of $ZrO_2$), 100 parts by weight of a magnesia-added zirconia fiber having an average diameter of 5 micrometers and an average length of from 20 to 30 millimeters (manufactured by Shinagawa Shirorenga), 1 part by weight of methyl cellulose and 5 parts by weight of an aqueous zirconium acetate solution ($ZrO_2=15\%$) were blended. After mixing, the blend was uniaxially pressed under a pressure of 50 $Kg/cm^2$ and dried to obtain a zirconia heating element. The zirconia heating element was fired at a temperature of 1,800° C. to obtain a fired product The characteristics of the fired product are shown in Table 1.

EXAMPLE 2

One hundred parts by weight of an yttria-stabilized zirconia powder having an average diameter of 1 millimeter (7% of $Y_2O_3$ and 93% of $ZrO_2$), 50 parts by weight of an yttria-stabilized zirconia fiber having an average diameter of 5 micrometers and an average length of from 20 to 30 millimeters (manufactured by Shinagawa Shirorenga), 5 parts by weight of a zirconium chloride powder, 2 parts by weight of foamed styrol beads having an average diameter of 1 millimeter and 30 parts by weight of water were blended. After mixing, the blend was poured into a molding flask and dried to obtain a zirconia heat-insulating refractory. This refractory was fired at a temperature of 1,800° C. to obtain a fired product. The characteristics of the fired product are shown in Table 1.

COMPARATIVE EXAMPLE 1

A zirconia molded product was obtained and fired as in example 1 except that no zirconia fibers were blended. The characteristics of the resulting product are shown in Table 1.

Cracks did not occur after drying treatment used in the production process.

COMPARATIVE EXAMPLE 2

A zirconia heating element was obtained as in Example 2 except that no zirconia fibers were blended.

Several cracks occurred after drying treatment used in the production process. The crack-free portions were fired. The characteristics of the fired product are shown in Table 1.

TABLE 1

|  | Example 1 | Example 2 | Comparative Example 1 | Comparative Example 2 |
|---|---|---|---|---|
| Cracks after drying | none | none | none | several cracks |
| Apparent porosity % | 45 | 85 | 40 | 75 |
| Bulk specific gravity | 2.3 | 1.4 | 2.4 | 1.6 |
| Bending strength $Kg/cm^2$ | 50 | 20 | 35 | 8 |
| Deflection at bending rupture mm | 5 | 3 | 0.5 | 0.3 |
| Thermal shock resistance | normal | normal | crack at a first time | crack at a first time |

Note 1) The shape of a specimen: 40 × 40 × 160 millimeters; span distance: 100 millimeters; and three-point bending test.
Note 2) Thermal shock resistance: spalling test (room temperature - 1,500° C. for 30 minutes - room temperature); the shape of a specimen: 230 × 114 × 65 millimeters; the test was repeated 5 times.

EXAMPLE 3

The molded product of Example 1 was immersed in an aqueous zirconium acetate solution ($ZrO_2=15\%$), pulled up, dried for 24 hours at a temperature of 100° C., and then heated at a temperature of 1,500° C. to obtain a zirconia heating element.

EXAMPLE 4

Fifty parts by weight of an yttria-stabilized zirconia fiber having an average diameter of 5 micrometers and an average length of from 20 to 30 millimeters, 50 parts by weight of a magnesia-added zirconia fiber having an average diameter of 5 micrometers and an average length of from 20 to 30 millimeters and 5 parts by weight of an yttria powder having an average grain size of from 10 to 50 micrometers were added to water as a dispersion medium to prepare a suspension for lay-up.

This suspension was laid to form a plate-shaped molded product. After molding, the molded product was dried for 24 hours at a temperature of 100° C. and then fired at a temperature of 1,600° C. to prepare a fiber molded product. The resulting molded product was immersed in an aqueous zirconium acetate solution (zirconia yield of 15%), pulled up, dried for 24 hours at a temperature of 100° C. and then heat treated at a temperature of 1,000° C. to obtain a zirconia refractory heating element.

Service Test (Current-passing Heating)

The materials and production conditions as described in Examples 1 through 4 and Comparative Examples 1 and 2 were used to prepare heating elements 1 wherein both ends 1a and 1a are larger than the central portion as shown in FIG. 1. The heating elements 1 were preheated to 1,500° C. by means of an auxiliary heater, a current is passed through each heating element 1 to generate heat to increase the temperature up to 2,000° C. in 30 minutes. During this period, the electric resistance and repetition service properties were measured. (Dimension of heating elements: total length: 200 millimeters; longitudinal length of central smaller portions except both ends 1a: 150 millimeters; length of one peripheral side of smaller portions: 10 millimeters; and length of one side of a tip surface of both ends 1a: 20 millimeters.)

The results are shown in Table 2.

TABLE 2

| Example No. | Service Properties (Repetitive Heat Generation Number) | Electric Resistance |
|---|---|---|
| Example 1 | failure after heating 18 times | — |
| Example 2 | failure after heating 20 times | — |
| Example 3 | normal after heating 50 times | — |
| Example 4 | normal after heating 100 times | 2 |
| Comparative Example 1 | failure after heating once | 3 |
| Comparative Example 2 | failure after heating once | 4 |

Note) Electric resistance is an electric resistance (Ω·cm) when 2,000° C. is reached. This electric resistance was calculated from current-voltage values which were supplied to the heating elements when current-passing heating was carried out.

Cylindrical or tubular heating elements having both ends 2a and 2a having a diameter larger than that of the central portion as shown in FIG. Z were subjected to the same test as described above, approximately the same results were obtained. (Dimension of the heating elements: total length: 200 millimeters; length of a central smaller portion except both ends 2a: 100 millimeters: diameter of the smaller portion: 10 millimeters; and diameter of both ends 2a: 20 millimeters.)

EXAMPLE 5

Fifty parts by weight of a magnesia-stabilized zirconia powder having a particle diameter of from 1 to 0.3 millimeter (5% of MgO and 95% of $ZrO_2$), 50 parts by weight of a magnesia-stabilized zirconia powder having a grain size of no more than 0.3 millimeter (5% of MgO and 95% of $ZrO_2$), 100 parts by weight of a magnesia-added zirconia fiber having an average diameter of 5 micrometers and an average length of from 20 to 30 millimeters (manufactured by Shinagawa Shirorenga), 2 parts by weight of methyl cellulose, 12 parts by weight of an aqueous zirconium acetate solution ($ZrO_2 = 4\%$) and 3 parts by weight of ethylene glycol as a plasticizer were blended. This blend was mixed and thereafter formed into a plate-shaped molded product. This refractory was dried and thereafter fired at a temperature of 1,800° C. to obtain a fired product. The characteristics of the fired product are shown in Table 3.

A green body obtained by injection molding the blend after mixing was dried, fired at a temperature of 1,800° C. to obtain a tubular zirconia heating element.

This heating element was subjected to a service test (induction heating) described hereinafter.

EXAMPLE 6

One hundred parts by weight of an yttria-stabilized zirconia powder having a particle diameter of no more than 0.3 millimeter (7% of $Y_2O_3$ and 93% of $ZrO_2$), 50 parts by weight of an yttria-stabilized zirconia fiber having an average diameter of 5 micrometers and an average length of from 20 to 30 millimeters (manufactured by Shinagawa Shirorenga), 1 part by weight of foamed styrol beads having an average diameter of 1 millimeter, 30 parts by weight of water and 2 parts by weight of yttria were blended and thereafter further 30 parts by weight of water were added to this blend. The resulting blend was mixed and formed into a plate-shaped molded product. This refractory was dried and thereafter fired at a temperature of 1,800° C. to obtain a fired product. The characteristics of the fired product are shown in Table 3.

The mixture described above was mixed and thereafter poured into a molding flask The mixture was dried and thereafter fired at a temperature of 1,800° C. to obtain a fired product. This fired product is slightly machined to obtain a tubular zirconia heating element. This heating element was subjected to the service test as described in Example 5.

COMPARATIVE EXAMPLE 3

A plate-shaped fired product and a zirconium heating element were obtained as in Example 5 except that no zirconia fibers were blended. The characteristics of this fired product are shown in Table 3.

Cracks did not occur after drying treatment used in the production process.

COMPARATIVE EXAMPLE 4

A specimen was obtained by firing as in Example 6 except that no zirconia fibers were blended. However, in this procedure, one sample per 2-3 samples exhibited cracks after firing, and therefore could not be used as a specimen.

TABLE 3

|  | Example 5 | Example 6 | Comparative Example 3 | Comparative Example 4 |
|---|---|---|---|---|
| Cracks after drying | none | none | none | several cracks |
| Apparent porosity % | 41 | 85 | 39 | 75 |
| Bulk specific gravity | 2.7 | 1.5 | 2.8 | 1.6 |
| Bending strength Kg/cm² | 90 | 20 | 95 | 7 |

Note 1) Shape of specimen: 40 × 40 × 160 millimeters; span distance: 100 millimeters; and three point bending test.

SERVICE TEST (INDUCTION HEATING)

Each of tubular heating elements 3 was prepared as described in Examples 5 and 6 and Comparative Examples 3 and 4 (FIGS. 3 and 4). As shown in FIGS. 3 and 4, an appropriate heat-insulating material was applied to the surface of the heating element 3 to form a heat-insulating layer 4. This was preheated to 1,500° C. by means of an auxiliary heater and thereafter placed in a magnetic field generated by passing a high frequency current through a coil for induction heating 5 to generate heat to increase the temperature up to 2,200° C. in 30 minutes. During this period, repetitive service properties were measured (Dimension of the heating element: diameter: 100 millimeters; thickness: 4 millimeters; and length: 100 millimeters). A zirconia (ZrO$_2$) heat-insulating board was used as a support for a heating element. The results are shown in Table 4.

TABLE 4

| Example No. | Service Properties (Repetitive Heat Generation Number) | Electric Resistance |
| --- | --- | --- |
| Example 5 | failure after heating 20 times | — |
| Example 6 | failure after heating 30 times | — |
| Comparative Example 3 | failure after heating once | — |
| Comparative Example 4 | failure after heating once | — |

It is not necessarily required to provide the heat-insulating layer 4 described above.

The values such as those of dimensions shown in Examples are exemplary values and it is possible to vary them appropriately. The shape of the heating element is not limited to the shape used in Examples described above and the heating element can be formed in any desired form. Naturally, it is possible to use the heating element (1, and 2) shown in FIGS. 1 and 2 in an induction heating process and it is possible to use the heating element (3) shown in FIGS. 3 and 4 in the current-passing heating process.

EXAMPLE 7

Thirty three parts by weight of the total amount of a polyvinyl acetate emulsion and a plasticizer (dibutyl phthalate) as flexible binders were added to 50 parts by weight of an yttria-stabilized zirconia fiber (Y7Z Fiber available from Shinagawa Shirorenga) and 50 parts by weight of an yttria-stabilized zirconia powder (7% of Y$_2$O$_3$ and 92% of ZrO$_2$). The blend was thoroughly mixed and transferred to a planar p? ate. The blend was spread using rollers to prepare a flexible sheet 6 having a thickness of 0.5 millimeters (See FIG. 5). This flexible sheet 6 was then wound around a stainless rod 7 having a diameter of 2 millimeters as a core to form a laminate body 8. On the other hand, a flexible sheet was cut to dimension which allows for variation due to firing, thereby preparing a sheet 6a for attaching a lead wire. This sheet 6a was wound around both ends of the laminate body 8 in the form of layers while securely fixing it by inserting the bent tips of lead wires 9 in the sheet 6a for attaching lead wires as shown in FIG. 5(a). Drying was carried out for 10 hours at a temperature of 150° C. as it was. Thereafter, the stainless rod 7 was removed, and prefiring was carried out at a temperature of 1,500° C. Thereafter, the prefired product was placed in an electric furnace and firing was carried out at a temperature of 2,000° C. by passing a current. The resulting fired product was used. The results are shown in Table 5.

EXAMPLE 8

The flexible binder used in Example 7 was incorporated in 50 parts by weight of the yttria-stabilized zirconia fiber used in Example 7, 45 parts by weight of an yttria-stabilized zirconia powder and 5 parts by weight of a magnesia-stabilized zirconia powder (4% of MgO and 96% of ZrO$_2$), and a flexible sheet was prepared as in Example 7. As shown in FIG. 6(a), this sheet was cut so that a concavity 10 having a taper was formed at its one end, thereby forming sheet portions 4b for attaching lead wires at both ends. The flexible sheet 6 was windingly laminated on the stainless rod 7 in the cylindrical form starting from the body portion, and thereafter the sheet portions 4b were wound around both ends of the laminate body 8 in the form of layers having tapers in an inner direction while attaching lead wires 9 as in Example 7. The whole was prefired at a temperature of 1,600° C. Thereafter, the prefired product was immersed in an aqueous solution containing zirconium acetate and yttrium acetate, and dried. The prefired product was placed in an electric furnace, and preheated up to 1,500° C. at an elevation rate of 3° C./minute by means of the electric furnace. Thereafter, a current was passed through the laminate body until the temperature was 2,000° C. The preheated product was therefore fired. The resulting fired product was used. The results are shown in Table 5.

EXAMPLE 9

Figure 7:
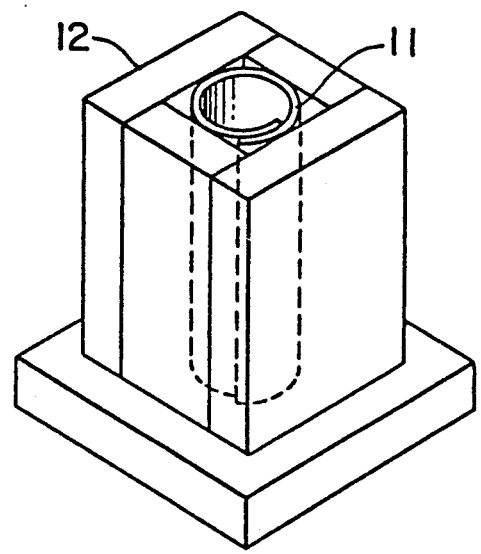
FIG. 7 is a perspective view showing the state wherein a heating element is disposed at a holding fixture.

Twenty eight parts by weight of a polyvinyl acetate emulsion containing 3% of yttria and 18% of a plasticizer (ethylene glycol) and 8 parts by weight of an aqueous zirconyl acetate solution (concentration of 20% on a ZrO$_2$ basis) were incorporated in 20 parts by weight of the yttria-stabilized fiber used in Example 7, 65 parts by weight of an yttria-stabilized zirconia powder and 15 parts by weight of an unstabilized zirconia powder. The blend was mixed to prepare a flexible sheet having a thickness of 1 millimeter. This sheet was wound three times around a paper pipe having a diameter of 100 millimeters. The self-hardening composition containing the zirconia fiber, i.e., the zirconia curing composition described above was applied to the last portion wound and the initial wound portion such that the width of about 2 millimeters was obtained, and the sheet was affixed to an adjacent layer. The laminate was allowed to stand for 12 hours in the intact state, and thereafter dried for 6 hours at a temperature of 150° C. to decrease flexibility As shown in FIG. 7, the laminate 11 was placed in a zirconia brick holding fixture 12 and its outer periphery was retained. The laminate 11 was prefired at a temperature of 1,600° C. The resulting prefired product was placed in an induction furnace and preheated. Thereafter, the prefired product was subjected to induction heating at an elevation rate of 2.5° C./min until the temperature was 2,200° C. Thus, the prefired product was fired. The resulting fired product was used. The results are shown in Table 5.

COMPARATIVE EXAMPLE 5

Five percent of a hemp yarn was incorporated in 95% of an yttria-stabilized zirconia powder. A flexible sheet was prepared using the binder and molding method of Example 7. An approximately cylindrical laminate was formed. This laminate generated several cracks in prefiring at 1,500° C. The resulting fired product was used. The results are shown in Table 5.

COMPARATIVE EXAMPLE 6

An attempt was made to form a laminate from a sheet of only an yttria-stabilized zirconia powder using the same binder and molding method as described in Example 7. However, slight cracks were generated in the stage of winding the sheet, and therefore the subsequent steps were discontinued.

up to 1,500° C., and thereafter, a current was passed to slowly heat the heating structure up to 2,000° C.

TABLE 5

|  | Example 7 | Example 8 | Example 9 | Comparative Example 5 | Comparative Example 6 |
|---|---|---|---|---|---|
| Shape type | cylindrical | cylindrical | cylindrical | cylindrical | Manufacture was discontinued on the way |
| Lead wire | Platinum wire (simultaneous molding) | Platinum wire (simultaneous molding) | none | Platinum wire (simultaneous molding) | |
| Heating method | Current-passing | Current-passing | Induction | Current-passing | |
| Highest retention temperature | 2,000° C. | 2,100° C. | 2,000° C. | 2,000° C. | |
| Repetitive elevation number (Service properties) | 65 times (normal) | 45 times (normal) | 30 times (slight cracks were recognized) | Cracks generated once, and failure occurred during second elevation process | |

In Examples 7 and 8, the electric resistance at 2,000° C. was from 3 to 7 ω·cm. In Comparative Example 5, the electric resistance was about 6 Ω·cm. Small variations in voltage and current were recognized when current was passed. It is believed that this is because cracks grow when current is passed.

EXAMPLE 10

Figure 8A:
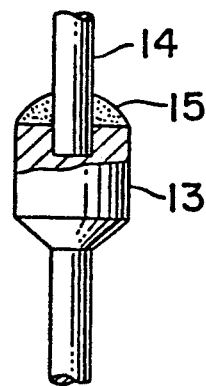
FIG. 8 (a) and (b) are views illustrating a junction site of a lead member and a zirconia heating element described in Example 10.
Figure 8B:
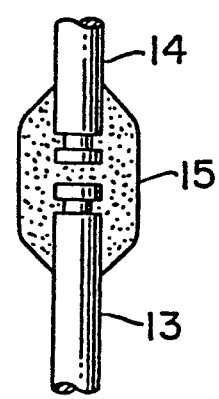

As shown in FIG. 8 (a) and (b), a rod-shaped zirconia heating element 13 containing 75% by weight of zirconia fiber and a molybdenum disilicide rod 14 which is a lead member for passing a current were secured using a zirconia curing composition 15 having the following composition:

| Composition | Parts by weight |
|---|---|
| Zirconia fiber | 50 |
| Zirconia powder | 50 |
| Aqueous zirconyl acetate solution (ZrO$_2$ yield of 20%) | 55 |
| Y$_2$O$_3$ powder | 4 |

The zirconia curing composition was allowed to stand for 4 hours until it self-hardened, dried for 24 hours at a temperature of 110° C., calcined at a temperature of 1,400° C. to develop strength, thereby obtaining a zirconia heating structure of the present invention.

The resulting heating structure was then placed in an electric furnace, and one ⓡnd of the molybdenum disilicide rod was arranged at the outside portion of the electric furnace. A conductor was clamped, the heating structure was preheated up to 1,500° C. A current was passed through the heating structure to use it as a heating element. This heating element can generate heat to increase the temperature to 2,000°-2,300° C. by passing a current. The junction between the heating element and the lead member is good and junction ruptures do not occur when current is passed.

A heating structure provided with a molybdenum disilicide lead member for passing a current, and which has been dried for 24 hours at a temperature of 110° C. was calcined at a temperature of 800° C. and placed in a furnace The heating structure was slowly preheated In the case of this procedure, a SiO$_2$ coat cannot be formed on the molybdenum disilicide rod portion which is present in the outside portion of the furnace during calcination, and thus the step of removing the SiO$_2$ coat before clamping could be omitted. The heating structures shown in FIG. 8(a) and (b) exhibited substantially the same junction performance.

The zirconia curing composition used in this example was formed into a 10 mm × 10 mm × 80 mm rod, and this rod was fired for 3 hours at a temperature of 1,700° C. to prepare a specimen. This specimen was used to examine the electrical resistance at high temperatures. The specimen had a conductivity of 7.7 Ω·cm at 1,700° C.

EXAMPLE 11

Figure 9:
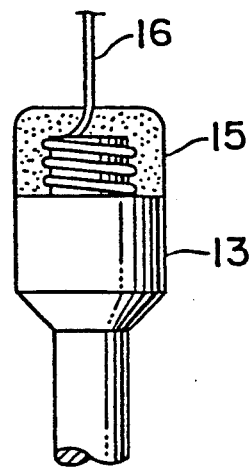
FIG. 9 is a view illustrating a junction site of a lead member and a zirconia heating element described in Example 11.

Both ends of a rod-shaped zirconia fiber heating element 13 produced by the lay-up method were subjected to grooving. As shown in FIG. 9, a platinum wire 16 having a diameter of 0.5 millimeter was wound and thereafter a zirconia curing composition 15 having the same composition as that used in Example 10 except that it contained 30 parts by weight of a zirconia fiber and 70 parts by weight of a zirconia powder was applied so that a groove formed in the heating element described above was embedded. The whole was fired for 2 hours at a temperature of 1,500° C. Thereafter, a zirconium acetate solution (ZrO$_2$ yield of 15%) was sprayed and allowed to stand for 4 hours. The whole was then dried for 24 hours at a temperature of 110° C. and calcined at a temperature of 1,200° C. It was attached so that one end of the platinum wire was present in the outside portion of the furnace. Said platinum wire was connected to a conductor. The whole was preheated to 1,500° C., and a current began to be passed carefully to gradually heat it up to 2,000° C.

The zirconium curing composition used in this example was formed into a 10 mm × 10 mm × 80 mm rod and this rod was fired for 3 hours at a temperature of 1,700° C. to prepare a specimen. This specimen was used to examine the electrical resistance at a high temperature. The specimen had a conductivity of 6.2 Ω·cm at 1,700° C.

While the heating element was heated to a temperature higher than the melting point of platinum from which the lead member was produced in this example, the temperature of terminal portions could be reduced by increasing the area of the terminal portions of the heating element, whereby melting of the lead member could be prevented.

EXAMPLE 12

Figure 10:
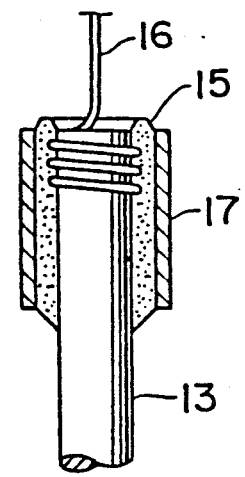
FIG. 10 is a view illustrating a junction site of a lead member and a zirconia heating element described in Example 12.

Both ends of a rod-shaped zirconia fiber heating element 13 produced by a lay-up method were subjected to grooving. As shown in FIG. 10, a platinum wire 16 was wound and thereafter a sleeve 17 composed of the same material as that of the heating element body was covered. A zirconia curing composition 15 having the same composition as that used in Example 10 except that it contained 70 parts by weight of a zirconia fiber and 30 parts by weight of a zirconia powder was applied so that a gap between the heating element body and the sleeve was embedded. The whole was fired for 2 hours at a temperature of 1,500° C. and impregnated with an aqueous zirconium acetate solution ($ZrO_2$ yield of 7%) to obtain a zirconia heating structure of the present invention.

The zirconia curing composition used in this example was formed into a 10 mm × 10 mm × 80 mm rod, and this rod was fired for 3 hours at a temperature of 1,700° C. to obtain a specimen. This specimen was used to examine the electrical resistance at high temperatures. The specimen had a conductivity of 8.0 Ω·cm at 1,700° C.

EXAMPLE 13

Figure 11A:
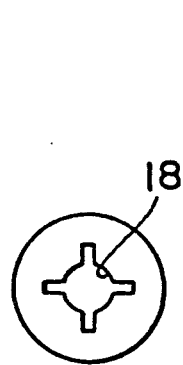
FIG. 11 (a), (b) and (c) are views illustrating a junction site of a lead member and a zirconia heating element described in Example 13.
Figure 11B:
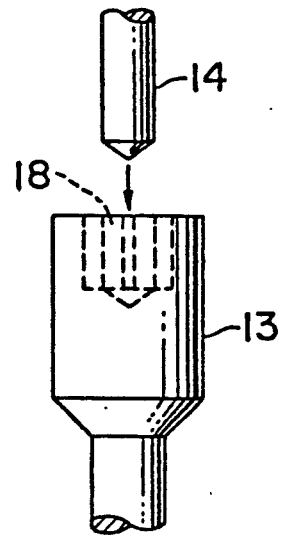
Figure 11C:
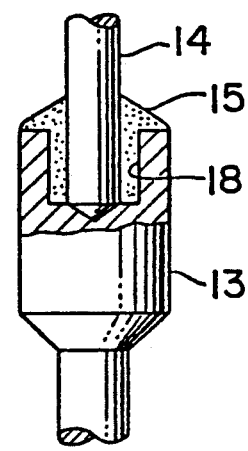

As shown in FIG. 11(a) and (b), grooves and holes 18 were formed in both ends of a rod-shaped heating element 13 composed of a zirconia powder and a zirconia fiber containing 30 parts by weight of the zirconia fiber. A zirconia curing composition 15 having the same composition as that used in Example 10 (except that it contained 15 parts by weight of a zirconia fiber and 85 parts by weight of a zirconia powder and an aqueous zirconium acetate solution ($ZrO_2$ yield of 15%) was used) was poured while vibrating the grooves and holes 18. Thereafter, a premachined silicon carbide rod 14 was immediately inserted. As shown in FIG. 11(c), a portion of excess composition was used to apply it to the surface of the silicon carbide rod and the whole was allowed to stand for 4 hours. Thereafter, the whole was dried for 24 hours at a temperature of 110° C., and calcined at a temperature of 800° C. to obtain a zirconia heating structure of the present invention.

The zirconia curing composition used in this example was formed into a 10 mm × 10 mm × 80 mm rod, and this rod was fired for 3 hours at a temperature of 1,700° C. to prepare a specimen. This specimen was used to examine the electrical resistance at high temperatures. The specimen had a conductivity of 5.5 Ω·cm at 1,700° C.

EXAMPLE 14

Example 11 was repeated except that the following procedure was used. In order to join a platinum wire to a heating element body, the following zirconia curing composition was used and applied Thereafter, the zirconia curing composition was dried for 4 hours at a temperature of 40° C., further dried for 24 hours at a temperature of 110° C., and calcined at a temperature of 1,500° C. to obtain a zirconia heating structure of the present invention.

| Composition | Parts by weight |
| --- | --- |
| Zirconia fiber | 30 |
| Zirconia powder | 70 |
| Aqueous zirconyl acetate solution ($ZrO_2$ yield of 15%) | 55 |
| $Y_2O_3$ powder | 7 |

The zirconia curing composition used in this example was formed into a 10 mm × 10 mm × 100 mm rod, and this rod was fired for 2 hours at a temperature of 1,500° C. to prepare a specimen. This specimen was used to examine the electrical resistance at a high temperature. The specimen had a conductivity of 6 Ω·cm at 1,700° C.

COMPARATIVE EXAMPLE 7

| Composition | Parts by weight |
| --- | --- |
| Zirconia powder | 100 |
| Aqueous zirconyl oxychloride solution (Zirconia yield of 20%) | 50 |
| $Y_2O_3$ powder | 7 |

The zirconia curing composition having the composition described above was used to join a zirconia heating element having a shape shown in FIG. 8(a) and (b) and a molybdenum disilicide lead member.

However, some cracks were observed in the cured portion of the zirconia curing composition after drying. Furthermore, when the composition was calcined at a temperature of 1,400° C., cracks developed and one side of the heating structure exhibited separation of the heating element body from molybdenum disilicide. Thus, the resulting product could not be used as a heating structure.

COMPARATIVE EXAMPLE 8

In order to join a heating element having a shape of Example 12 and a platinum wire, a zirconia curing composition was used wherein 5 parts by weight of polyvinyl alcohol were further added to the zirconia curing composition used in Comparative Example 7 in order to reinforce the tack strength and dry strength. Thus, a heating structure was formed.

This heating structure was calcined and thereafter used as a heating element. When retention for one hour at 2,000° C. was repeated three times, it seems that contact resistance generated due to cracks in the cured product of the zirconia curing composition. The lead member composed of the platinum wire therefore generates abnormally high heat and the platinum wire fused as a consequence.

What is claimed is:

1. A process for producing a laminate-shaped zirconia refractory heating element which generates heat by passing a current or by induction heating, said process comprising the steps of incorporating a flexible binder in a filler composed of zirconia fibers and a stabilizer containing zirconia powders; forming the mixture into a refractory sheet having flexibility at room temperature; windingly laminating said refractory sheet in the form of a roll or folding it in the form of a multilayer; and firing the laminate.

2. The process according to claim 1 wherein in laminating said refractory sheet, the attaching side of a lead wire for passing a current is fixed to the refractory sheet, and thereafter said sheet is laminated.

3. The process according to claim 1 or 2 wherein an emulsion of a vinyl acetate resin or polyacrylate and at least one plasticizer selected from ethylene glycol, glycerin, and dibutyl phthalate are used as said flexible binder.

4. The process according to claim 1 wherein there is used from 20 to 50 parts by weight of the binder based on 100 parts by weight of the filler composed of from 5 to 80 parts by weight of the zirconia fibers and from 20 to 95 parts by weight of the stabilizer containing zirconia powders.

* * * * *